United States Patent
Matsuda

(10) Patent No.: US 7,622,826 B2
(45) Date of Patent: Nov. 24, 2009

(54) FLICKER IMPROVEMENT EFFECT EVALUATING SYSTEM

(75) Inventor: Akihiro Matsuda, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 22 days.

(21) Appl. No.: 12/121,383

(22) Filed: May 15, 2008

(65) Prior Publication Data
US 2009/0184694 A1 Jul. 23, 2009

(30) Foreign Application Priority Data
Jan. 23, 2008 (JP) ............................. 2008-012750

(51) Int. Cl.
*H02J 3/24* (2006.01)
*G05F 1/70* (2006.01)

(52) U.S. Cl. ....................................... 307/102; 323/211

(58) Field of Classification Search ................... 345/78; 307/105, 102, 98; 323/210, 211
See application file for complete search history.

(56) References Cited
U.S. PATENT DOCUMENTS
7,173,349 B2 * 2/2007 Bijlenga et al. ............... 307/98

FOREIGN PATENT DOCUMENTS
| JP | 2003-324847 A | 11/2003 |
| JP | 2005-080368 A | 3/2005 |
| JP | 2006-352943 A | 12/2006 |

OTHER PUBLICATIONS

Hirofumi Akagi et al., "Generalized Theory of the Instantaneous reactive Power and its Application", Journal B Institute of Electrical Engineers of Japan, 1983, pp. 483-490.

* cited by examiner

*Primary Examiner*—Shawn Riley
(74) *Attorney, Agent, or Firm*—Buchanan Ingersoll & Rooney PC

(57) ABSTRACT

A flicker improvement effect evaluating system evaluates an effect of improvement of voltage flicker in a power system to which a static reactive power compensator is to be introduced. A system voltage operating unit operates a compensation current and a system impedance of the power system, based on actually measured data of system voltage and load current read from a data reading unit. Based on the results of operations and the actually measured data, a not-yet-improved system voltage at present and an improved system voltage attained when the static reactive power compensator is provided on a bus are simulated. By a flicker meter, flicker values of the not-yet-improved system voltage and improved system voltage amplified by an amplifying circuit are measured, and from the flicker values, the rate of improvement attained by the static reactive power compensator is operated.

5 Claims, 4 Drawing Sheets

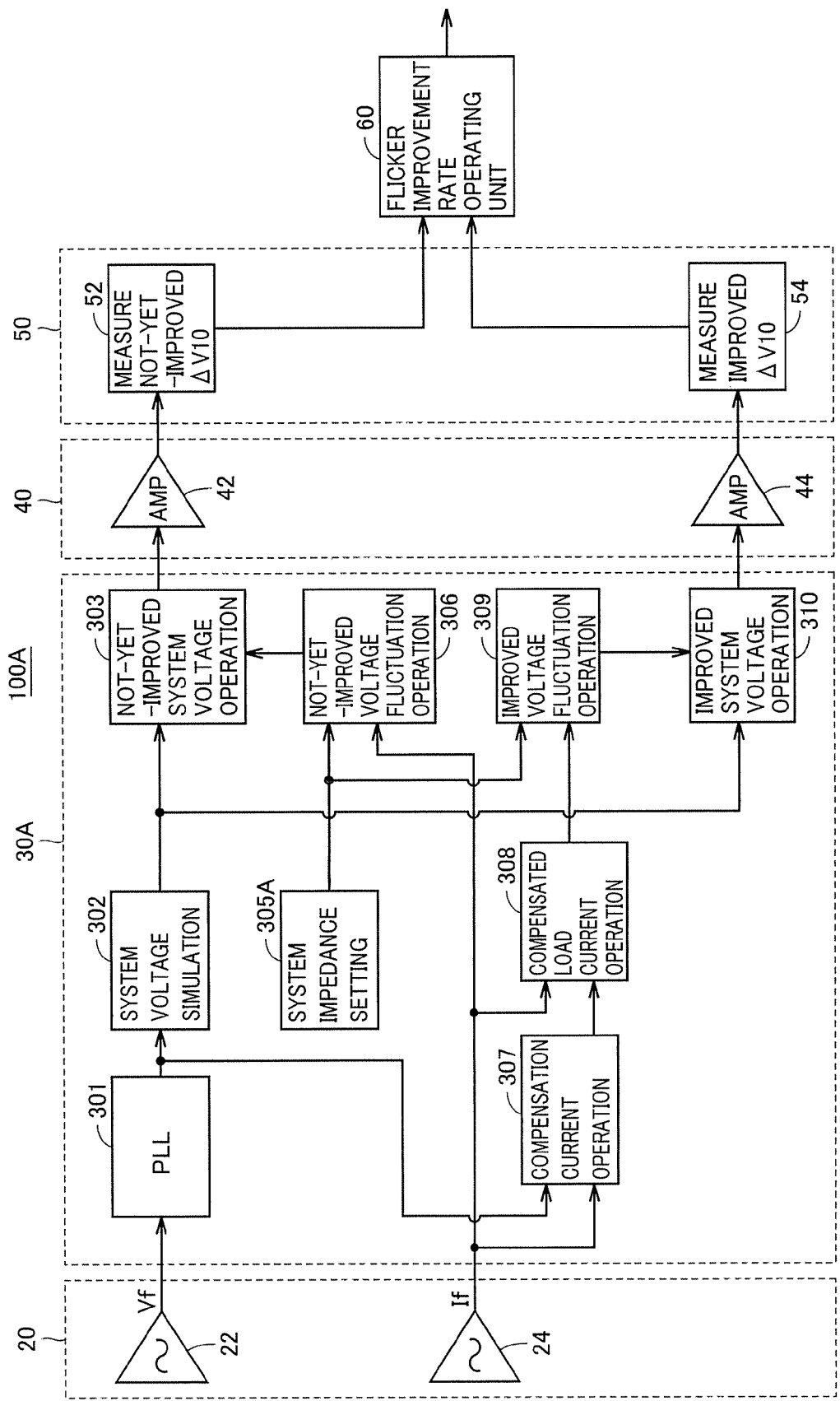

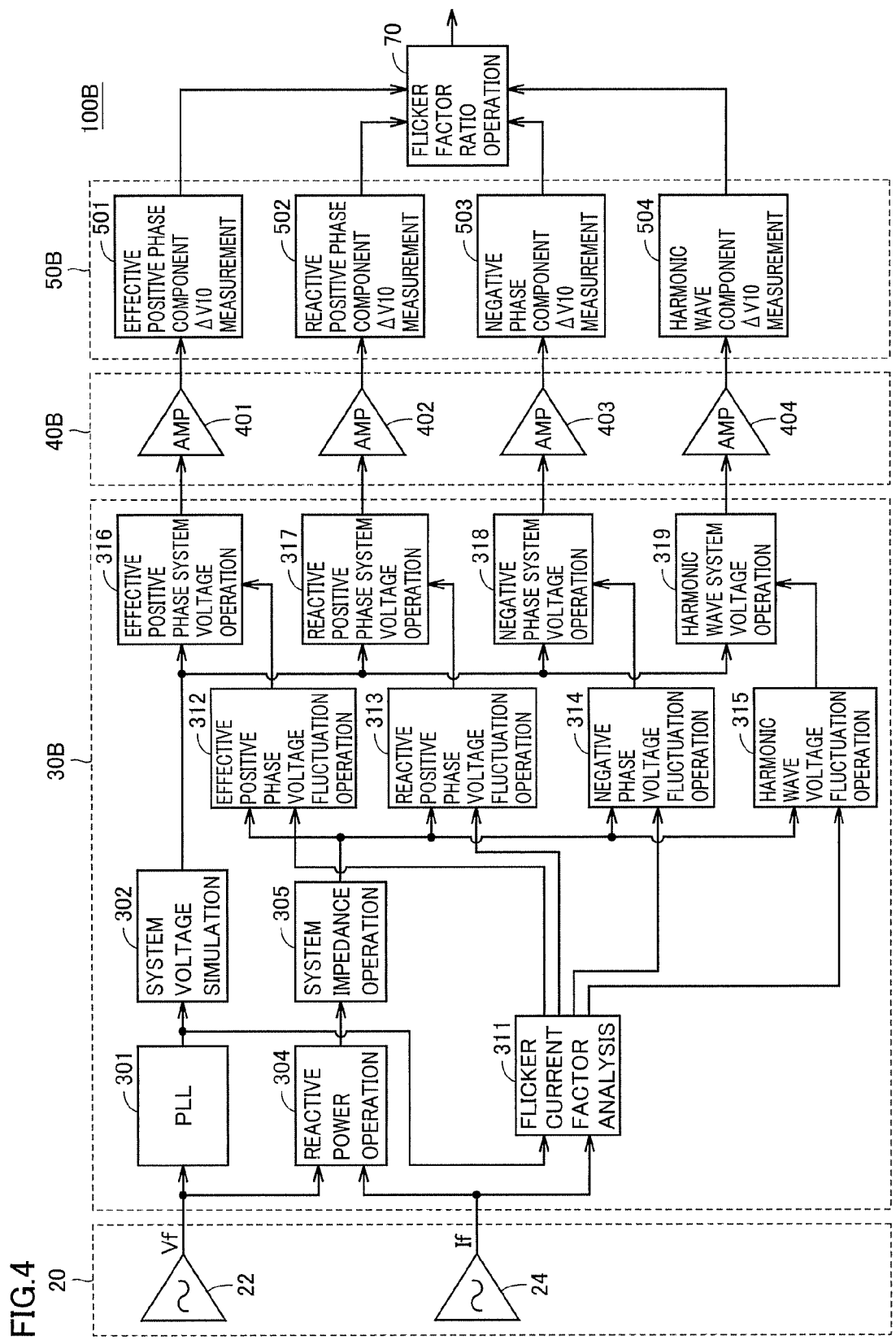

FLICKER IMPROVEMENT EFFECT EVALUATING SYSTEM

BACKGROUND OF THE INVENTION

1. Field of the Invention

The present invention relates to a flicker improvement effect evaluating system and, more specifically, to a system for evaluating beforehand the effect of improving voltage flicker, for introducing a static reactive power compensator to a power system.

2. Description of the Background Art

A phenomenon called voltage flicker has been known as a form of voltage fluctuation in a power system. Voltage flicker occurs, in a large-scale electric installation such as an arc furnace load, because of abrupt and temporally irregular fluctuation of reactive power component caused by start and stop of operation or load fluctuation of the installation and of negative phase component caused by arm short-circuit. When voltage flicker occurs, general consumers fed from the same substation experiences unsteady shining of illumination load or wobble of TV receiver images, which are uncomfortable.

As a measure for mitigating such voltage flicker and improving voltage stability, an arrangement has been widely used in which a static reactive power compensator compensates for the flicker component (reactive power component, negative phase component), following voltage fluctuation of the power system (for example, see Japanese Patent Laying-Open Nos. 2005-080368, 2003-324847, 2006-352943). By this arrangement, the static reactive power compensator compensates for the flicker component generated by the arc furnace load as the source of voltage flicker, and hence, the voltage flicker can be mitigated.

On the other hand, when the static reactive power compensator is installed in the power system, compensation of the flicker component with as small compensation capacity as possible of the static reactive power compensator is desired, from the economical point of view. Therefore, when planning installation of a static reactive power compensator, it is desirable to evaluate in advance the effect of improving voltage flicker, to maximize the effect of applying the static reactive power compensator with limited compensation capacity.

The voltage flicker, however, varies dependent on where the static reactive power compensator is installed. Therefore, it is difficult to find the effect of improving voltage flicker in a single uniform way by a general calculation. Specifically, a voltage Vf of the power system as the object to which the static reactive power compensator is installed, is represented by Equation (1) below, where If denotes a load current flowing from a bus to an arc furnace load, Zs denotes system impedance of the system upper than the bus, and Vs denotes voltage behind upper power system:

$$Vf = Vs - Zs \cdot If \qquad (1)$$

As is apparent from Equation (1), the voltage flicker generated in system voltage Vf differs considerably, dependent on difference in system impedance and difference in load current If that depends on type of arc furnace and presence/absence of any other voltage flicker source.

In view of the foregoing, recently, a flicker suppression effect simulator for simulating the effect of suppressing site-specific flicker, such as disclosed in Japanese Patent Laying-Open No. 2006-352943, has been proposed.

Specifically, the flicker suppression effect simulator simulates, based on the voltage of the electric power system and a current as an object of compensation flowing to the flicker source such as the arc furnace installation from the power system through a bus, the not-yet-improved system voltage at present and the improved system voltage as improved by the installation of a static reactive power compensator to the bus to which the current as the object of compensation flows, and from flicker values of the simulated not-yet-improved system voltage and improved system voltage, operates an improvement rate attained by the flicker compensator.

According to the flicker suppression effect simulator described in Japanese Patent Laying-Open No. 2006-352943, in the power system to which the static reactive power compensator is to be installed, the flicker value and the improvement rate when the static reactive power compensator is connected to a prescribed bus can be simulated easily by simply taking in the actual system voltage and the actual current flowing through the object of compensation.

Because of the following reasons, however, the flicker suppression effect simulator described in Japanese Patent Laying-Open No. 2006-352943 cannot very accurately simulate the effect of flicker suppression.

Specifically, the system voltage Vf is determined by the system impedance Zs and load current If, as can be seen from Equation (1). The system impedance Zs is a variable value that changes momentarily in accordance with the power system setup reflecting season or time of day. Though the system impedance Zs can be approximated on the desk by checking state of operation of a generator or generators of the power company, it is not so easy to calculate accurate impedance value on the desk, considering state of power generating operations of neighboring consumers.

Though Japanese Patent Laying-Open No. 2006-352943 discloses an arrangement for simulating the not-yet-improved and improved system voltages based on the system voltage and the current flowing to the flicker source, it is silent about such fluctuation of the system impedance Zs in the process of operating the system voltage. Therefore, the arrangement cannot accurately derive the voltage flicker generated in the system voltage Vf.

SUMMARY OF THE INVENTION

Therefore, an object of the present invention is to provide a flicker improvement effect evaluating system capable of accurately evaluating the effect of improving voltage flicker by the static reactive power compensator.

According to an aspect, the present invention provides a flicker improvement effect evaluating system for evaluating an effect of improving voltage flicker attained by a compensator introduced to a power system having a load connected to a prescribed bus. The flicker improvement effect evaluating system includes: a system voltage detecting unit detecting a system voltage; a load current detecting unit detecting a load current flowing to the load through the prescribed bus; a compensation current operating unit operating a compensation current output by the compensator, based on the detected system voltage and the load current; a system impedance operating unit operating system impedance of the power system based on the detected system voltage and the load current; a not-yet-improved system voltage operating unit simulating a not-yet-improved system voltage at present, from the operated system impedance and the detected system voltage and the load current; an improved system voltage operating unit simulating an improved system voltage from the operated compensation current and the system impedance and from the detected system voltage; a voltage flicker detecting unit detecting voltage flicker of each of the operated not-yet-improved system voltage and the improved system voltage, and an improvement rate operating unit operating rate of improvement attained by the compensator, from the detected respective voltage flickers.

The present invention enables accurate evaluation of voltage flicker improving effect attained by introducing the static reactive power compensator. As a result, voltage stability of the power system can further be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing a control structure in the flicker improvement effect evaluating system in accordance with Embodiment 2 of the present invention.

FIG. 4 is a block diagram showing a control structure in the flicker improvement effect evaluating system in accordance with Embodiment 3 of the present invention.

DESCRIPTION OF THE PREFERRED EMBODIMENTS

Figure 1:
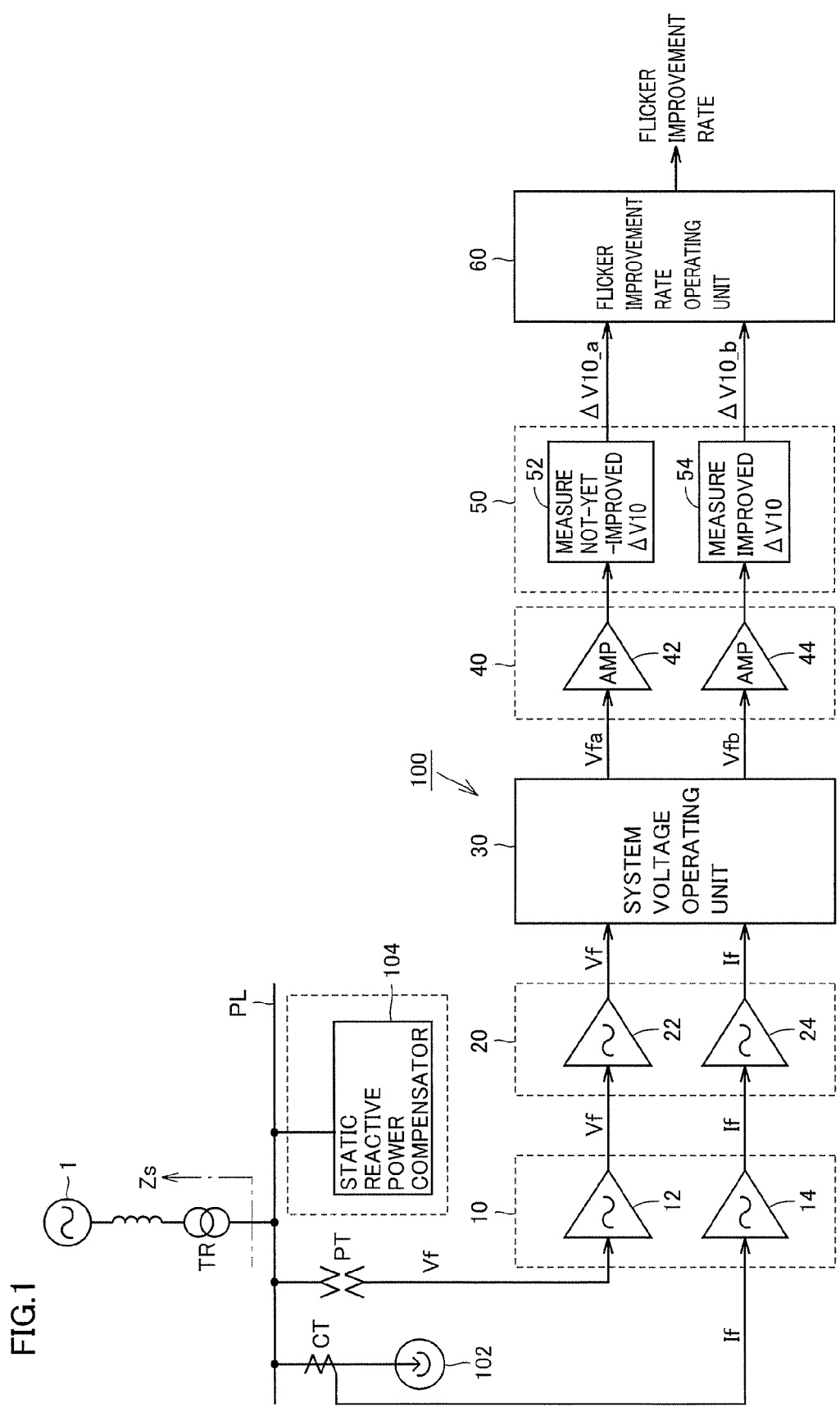
FIG. 1 shows a schematic configuration of a power system to which the flicker improvement effect evaluating system in accordance with Embodiment 1 of the present invention is applied.

In the following, embodiments of the present invention will be described in detail with reference to the figures. In the figures, the same or corresponding portions will be denoted by the same reference characters.

Embodiment 1

FIG. 1 shows a schematic configuration of a power system to which the flicker improvement effect evaluating system in accordance with Embodiment 1 of the present invention is applied.

Referring to FIG. 1, the power system includes a bus PL connected to an upper system 1 through a transformer TR provided in a substation, a load 102 connected to the bus PL, and a static reactive power compensator 104 connected to the bus PL in parallel with load 102.

Load 102 is, by way of example, a large-scale electric installation such as an arc furnace or an electric motor in a factory. When reactive power component or negative phase component fluctuates considerably because of start or stop of load 102, voltage fluctuation (flicker) occurs on bus PL. The voltage flicker affects electric equipment in the factory, or causes unsteady shining of illumination or wobble of TV receiver images (flicker phenomenon) at general consumer households connected to the bus.

Static reactive power compensator 104 constitutes means for controlling voltage stabilization, for stabilizing the voltage of bus PL. The static reactive power compensator 104 may be a Static Var Compensator (SVC) or Static Synchronous Compensator (STATCOM).

By way of example, an internal controller operates an output value of static reactive power compensator 104 so that flicker component generated by load 102 attains to zero. Then, a gate pulse having such a phase control angle that static reactive power compensator 104 generates the operated output value is applied to a thyristor. By the controller adjusting the output amount of static reactive power compensator 104 in accordance with the amount of flicker of load 102, the voltage flicker can be mitigated.

On the other hand, when the static reactive power compensator 104 is to be introduced to the power system, compensation of the reactive power with as small compensation capacity as possible is desired, from the viewpoint of reducing economic burden. Therefore, in order to maximally enjoy the effect attained by applying the static reactive power compensator 104 with limited compensation capacity, it is important to evaluate in advance the effect of improving voltage flicker in the stage of planning installation of static reactive power compensator 104.

The voltage flicker, however, varies differently dependent on where the static reactive power compensator 104 is actually installed, because of the difference of system impedance Zs, and difference of load current If that depends on type of arc furnace or presence/absence of any other voltage flicker source. Particularly, system impedance Zs is a variable value that changes momentarily in accordance with the power system setup reflecting season or time of day, and therefore, it is difficult to find accurate impedance value by calculation on the desk. Consequently, it is not so easy to find the effect of improving voltage flicker in a single uniform way by a general calculation.

Therefore, in the flicker improvement effect evaluating system in accordance with the present embodiment, in the power system to which static reactive power compensator 104 is to be installed, system impedance Zs is operated based on actually measured data of system voltage Vf and load current If, and using the operated system impedance Zs, improvement rate attained by connecting static reactive power compensator 104 to the bus PL is operated. As the improvement rate of voltage flicker is operated reflecting conditions inherent to the installation environment, it becomes possible to accurately evaluate the effect of improving voltage flicker in the power system to which the static reactive power compensator 104 is to be introduced.

In the following, control structure of a flicker improvement effect evaluating system 100 in accordance with the present embodiment will be described, with reference to FIGS. 1 and 2.

Referring to FIG. 1, flicker improvement effect evaluating system 100 is connected to the bus PL in parallel with load 102.

Flicker improvement effect evaluating system 100 includes: a gauge transformer PT, a current sensor CT inserted to a connection line between the bus PL and load 102; a data storage unit 10 storing values detected by gauge transformer PT and current sensor CT as actually measured data; a data reading unit 20 reading the actually measured data at an arbitrary time point from data storage unit 10; a system voltage operating unit 30 operating not-yet-improved system voltage Vfa at present and improved system voltage Vfb attained when static reactive power compensator 104 is provided to bus PL, based on the read actually measured data; an amplifying circuit 40 amplifying the not-yet-improved system voltage Vfa and improved system voltage Vfb, a flicker meter 50 measuring flicker values of not-yet-improved system voltage Vfa and improved system voltage Vfb; and a flicker improvement rate operating unit 60.

Data storage unit 10 includes a voltage value storage unit 12 and a current value storage unit 14. These storage units each have a memory and a timer provided therein, not shown. Receiving the system voltage Vf from gauge transformer PT, voltage value storage unit 12 stores in the memory the obtained system voltage Vf, in association with the time point when the system voltage Vf is obtained, input from the timer. Receiving the load current If from current sensor CT, current value storage unit 14 stores in the memory the obtained load current If, in association with the time point when the load current is obtained, input from the timer. Thus, it follows that system voltage Vf and load current If are stored in time-sequential manner in data storage unit 10.

Data reading unit 20 includes a voltage value reading unit 22 and a current value reading unit 24. Voltage value reading unit 22 reads the system voltage Vf obtained at an arbitrary time point from the memory of voltage value storage unit 12, and outputs the read voltage to system voltage operating unit 30. Current value reading unit 24 reads the load current If obtained at an arbitrary time point from the memory in current value storage unit 14, and outputs the read current to system voltage operating unit 30.

In this manner, data storage unit 10 and data reading unit 20 store the actually measured data of system voltage Vf and load current If in time-sequential manner, and allow reading of the stored actually measured data, designating an arbitrary time point. Thus, when higher effect of improvement is desired, improvement rate of voltage flicker may be repeatedly operated based on the read actually measured data, while varying control parameters such as compensation capacity of static reactive power compensator 104.

Receiving the system voltage Vf and load current If of an arbitrary time point from data reading unit 20, system voltage operating unit 30 simulates not-yet-improved system voltage Vfa and improved system voltage Vfb based on the actually measured data. The not-yet-improved system voltage Vfa corresponds to the system voltage at present of the power system to which static reactive power compensator 104 is to be introduced. Improved system voltage Vfb corresponds to the system voltage when static reactive power compensator 104 is connected to bus PL.

Amplifying circuit 40 includes amplifiers 42 and 44. Amplifier 42 amplifies not-yet-improved system voltage Vfa to a level corresponding to AC 100V, and outputs the amplified voltage to flicker meter 50. Amplifier 44 amplifies improved system voltage Vfb to a level corresponding to AC 100V, and outputs the amplified voltage to flicker meter 50.

Receiving the not-yet-improved system voltage Vfa and improved system voltage Vfb from amplifying circuit 40, flicker meter 50 measures flicker value ΔV10 of each system voltage. Specifically, a not-yet-improved flicker value measuring unit 52 measures flicker value ΔV10_a of simulated waveform of not-yet-improved system voltage Vfa applied from amplifier 42, using an FM operating circuit having a function of flicker meter. An improved flicker value measuring unit 54 measures flicker value ΔV10_b of simulated waveform of improved system voltage Vfb, applied from amplifier 44, using an FM operating circuit having a function of flicker meter.

The flicker value ΔV10 is one of the indexes representing voltage flicker, and it is measured by flicker meter 50 at every one minute. Flicker value ΔV10 is defined by Equation (2) below, where ΔVn represents fluctuation range of voltage fluctuation component of fluctuation frequency fn obtained as a result of frequency analysis of voltage fluctuation for one minute, and an represents luminous efficacy factor corresponding to the fluctuation frequency fn:

$$\Delta V 10 = \sqrt{\sum_{n=1}^{\infty} (an \cdot \Delta Vn)^2} \quad (2)$$

Not-yet-improved flicker value ΔV10_a and improved flicker value ΔV10_b measured by flicker meter 50 are output to flicker improvement rate operating unit 60.

Flicker improvement rate operating unit 60 compares not-yet-improved flicker value ΔV10_a and improved flicker value ΔV10_b, and operates improvement rate of voltage flicker as an index representing effect of improving voltage flicker attained by the installation of static reactive power compensator 104. The improvement rate of voltage flicker operated at this time is utilized to evaluate the effect of applying static reactive power compensator 104 when the static reactive power compensator 104 is actually provided on bus PL.

Specifically, if the operated improvement rate exceeds a preset threshold value, installation of static reactive power compensator 104 to a prescribed bus PL is determined to be effective to mitigate voltage flicker. On the other hand, if the operated improvement rate is not higher than the threshold value, installation of static reactive power compensator 104 to a prescribed bus PL is determined to be ineffective to mitigate voltage flicker. In that case, characteristics of static reactive power compensator 104 to be introduced are adjusted by changing, for example, compensation capacity, and the improvement rate is operated again based on actually measured data read from data storage unit 10, so as to attain higher effect of improving voltage flicker.

Figure 2:
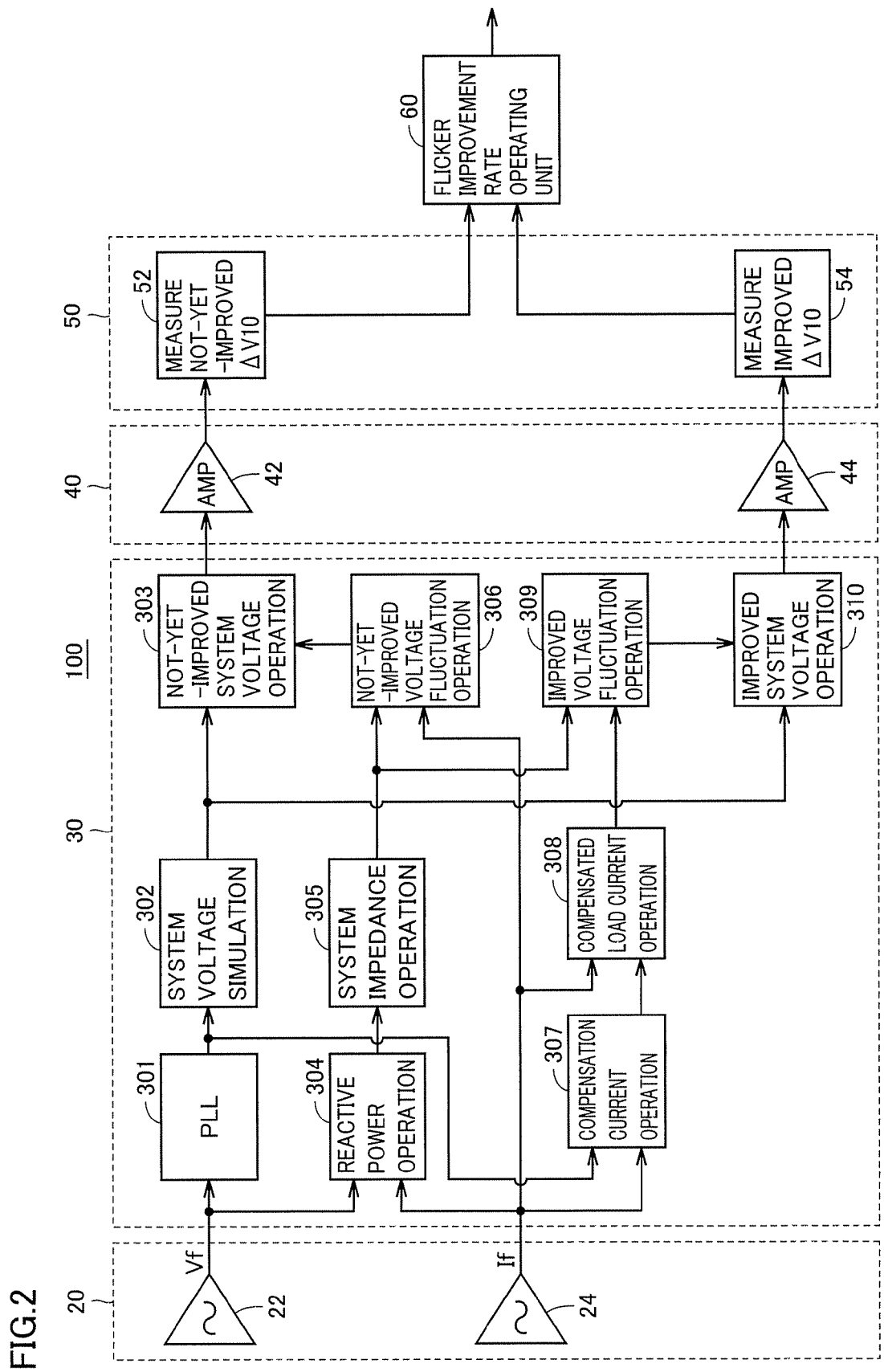
FIG. 2 is a block diagram showing more detailed control structure in the system voltage operating unit of FIG. 1.

FIG. 2 is a block diagram representing a more detailed control structure in system voltage operating unit 30 shown in FIG. 1.

Referring to FIG. 2, system voltage operating unit 30 includes: a PLL (Phase Locked Loop) circuit 301; a system voltage simulating circuit 302; a not-yet-improved system voltage operating circuit 303; a reactive power operating circuit 304; a system impedance operating circuit 305; a not-yet-improved voltage fluctuation operating circuit 306; a compensation current operating circuit 307; a compensated load current operating circuit 308; an improved voltage fluctuation operating circuit 309; and an improved system voltage operating circuit 310.

Receiving the system voltage Vf from voltage value reading unit 22, PLL circuit 301 detects phase of the system voltage Vf. Then, PLL circuit 301 outputs the detected phase information to system voltage simulating circuit 302 and compensation current operating circuit 307.

System voltage simulating circuit 302 generates an ideal sinusoidal wave free of distortion and in-phase with system voltage Vf, based on the phase information from PLL circuit 301. Specifically, system voltage simulating circuit 302 transforms the system voltage Vf to an ideal system voltage. The transformed system voltage Vf is input to not-yet-improved system voltage operating circuit 303 and to improved system voltage operating circuit 310.

Receiving the system voltage Vf from voltage value reading unit 22 and receiving load current If from current value reading unit 24, reactive power operating circuit 304 operates reactive power Qβ generated on bus PL, from the system voltage Vf and load current If. According to Technical Report No. 69 of IEEJ, the operation of reactive power Qβ in a circuit having phase voltages $E_A$, $E_B$ and $E_C$ and line currents $I_A$, $I_B$ and $I_C$, is defined by Equation (3), where $V\alpha=V_A$, $V\beta=1/\sqrt{3}(E_B-E_C)$, $I\alpha=I_A$ and $I\beta=1/\sqrt{3}(I_B-I_C)$:

$$Q\beta = \frac{3}{2} V\beta I\beta \cos\theta\beta \quad (3)$$

In the equation above, θβ represents phase difference angle between Vβ and Iβ.

Next, system impedance operating circuit 305 operates system impedance Zs from the operated reactive power Qβ and the state of system voltage Vf. System impedance Zs is derived by inputting fluctuation components ΔQβ and ΔVf of reactive power Qβ and system voltage Vf to Equation (4):

$$Zs = \frac{\Delta Vf}{\Delta If} = \frac{\Delta Vf}{\frac{\Delta Q\beta}{\sqrt{3} \, Vf}} \quad (4)$$

System impedance Zs operated in this manner is output to not-yet-improved voltage fluctuation operating circuit 306 and to improved voltage fluctuation operating circuit 309. Not-yet-improved voltage fluctuation operating circuit 306 multiplies the system impedance Zs by the load current If from current value reading unit 24, thereby to operate voltage fluctuation generated on bus PL before improvement. The thus operated voltage fluctuation of bus PL before improvement is applied to not-yet-improved system voltage operating circuit 303.

Not-yet-improved system voltage operating circuit 303 adds the operated not-yet-improved voltage fluctuation to the ideal system voltage waveform applied from system voltage simulating circuit 302, to obtain a simulated waveform of not-yet-improved system voltage. The obtained simulated waveform of not-yet-improved system voltage is amplified by amplifier 42 to a level corresponding to AC 100V, and output to not-yet-improved flicker value measuring unit 52.

Compensation current operating circuit 307 operates, based on the phase information of system voltage Vf detected by PLL circuit 301 and on load current If from current value reading unit 24, the compensation current output from static reactive power compensator 104.

Compensated load current operating circuit 308 adds the compensation current operated in compensation current operating circuit 307 to load current If from current value reading unit 24. Specifically, to the load current If, the compensation current of static reactive power compensator 104 is added to compensate for the fluctuation component of load current If.

Receiving system impedance Zs from system impedance operating circuit 305 and receiving the load current If compensated for by static reactive power compensator 104 from compensated load current operating circuit 308, improved voltage fluctuation operating circuit 309 multiplies system impedance Zs by load current If, thereby to operate voltage fluctuation generated on bus PL after improvement. The operated improved voltage fluctuation on bus PL is applied to improved system voltage operating circuit 310.

Improved system voltage operating circuit 310 adds the operated improved voltage fluctuation to the ideal system voltage waveform applied from system voltage simulating circuit 302, to provide a simulated waveform of improved system voltage. The obtained simulated waveform of the improved system voltage is amplified by amplifier 44 to a level corresponding to AC 100V, and output to improved flicker value measuring unit 54.

As described above, in system voltage operating unit 30, based on the actually measured data of system voltage Vf and load current If at an arbitrary time point read by data reading unit 20, the system impedance Zs at the arbitrary time point is operated. Using the operated system impedance Zs, not-yet-improved system voltage Vfa and improved system voltage Vfb are simulated. Specifically, the simulated not-yet-improved and improved system voltages reflect varying state of system impedance Zs that changes momentarily in accordance with the power system setup reflecting season or time of day. Accordingly, flicker meter 50 in the succeeding stage can measure the flicker values ΔV10 of not-yet-improved system voltage Vfa and improved system voltage Vfb. As a result, as compared with the conventional flicker suppression effect simulator not reflecting the varying state of system impedance Zs to its simulation, it becomes possible to more accurately evaluate the effect of improving voltage flicker attained by the introduction of static reactive power compensator 104.

In the present embodiment, as the flicker value, ΔV10 as an equivalent of 10 Hz standard adopted domestically is used. An arrangement using a short term flicker value Pst and a long term flicker value Plt of IEC standard adopted widely abroad may be used. In that case, flicker meter 50 may be configured to allow selection of one of these indexes.

As to the correspondence between the embodiment shown in FIGS. 1 and 2 and the present invention, gauge transformer PT corresponds to the "system voltage detecting unit", current sensor CT corresponds to the "load current detecting unit", and system voltage operating unit 30 implements the "compensation current operating unit", "system impedance operating unit", "not-yet-improved system voltage operating unit" and "improved system voltage operating unit." Further, flicker meter 50 implements "voltage flicker detecting unit" and flicker improvement rate operating unit 60 implements "improvement rate operating unit."

Embodiment 2

FIG. 3 is a block diagram showing a control structure in a flicker improvement effect evaluating system 100A in accordance with Embodiment 2 of the present invention.

Referring to FIG. 3, flicker improvement effect evaluating system 100A corresponds to flicker improvement effect evaluating system 100 shown in FIGS. 1 and 2, with system voltage operating unit 30 changed to system voltage operating unit 30A. Therefore, detailed description of other common circuit portions will not be repeated.

Specifically, in system voltage operating unit 30A in accordance with the present embodiment, system impedance operating circuit 305 of system voltage operating unit 30 of FIG. 2 is changed to a system impedance setting circuit 305A. In other words, the present embodiment, which is configured to allow setting of system impedance Zs to an arbitrary impedance value, differs from Embodiment 1 in which system impedance Zs is successively operated from actually measured data of system voltage Vf and load current If.

In system impedance setting circuit 305A, system impedance Zs is set, for example, to the maximum value of system impedance that varies in accordance with the setup of the power system. As the not-yet-improved system voltage Vfa and improved system voltage Vfb are operated with the system impedance Zs fixed at the maximum value, the effect of improving voltage flicker in a situation of maximum voltage flicker can be evaluated.

Alternatively, if an arrangement setting system impedance Zs by switching among a plurality of impedance values is adopted, it becomes possible to evaluate the effect of improving voltage flicker in a power system planned for the future (future system) taking into consideration a scenario of variation in the state of operation of load 102.

Embodiment 3

FIG. 4 is a block diagram showing a control structure in a flicker improvement effect evaluating system 101B in accordance with Embodiment 3 of the present invention.

Referring to FIG. 4, flicker improvement effect evaluating system 100B includes a data storage unit 10 (not shown), a data reading unit 20, a system voltage operating unit 30B, an amplifying circuit 40B, a flicker meter 50B, and a flicker factor ratio operating unit 70.

Data reading unit 20 reads actually measured data of system voltage Vf and load current If at an arbitrary time point in the similar manner as data reading unit 20 of Embodiment 1 described above, and outputs the read actually measured data to system voltage operating unit 30B.

Different from system voltage operating unit 30 in accordance with Embodiment 1, system voltage operating unit 30B does not operate the compensation current of static reactive power compensator 104. Specifically, it is configured not to find the improvement rate of voltage flicker but to analyze flicker factors generated by load 102, from the actually measured data of system voltage Vf and load current If. The flicker factors refer to factors influencing voltage flickers, which are mainly classified into four factors, that is, effective positive phase component, reactive positive phase component, reactive negative phase component and harmonic wave component.

Specifically, system voltage operating circuit 30B includes: a PLL circuit 301; a system voltage simulating circuit 302; a reactive power operating circuit 304; a system impedance operating circuit 305; a flicker current factor decomposing circuit 311; an effective positive phase voltage fluctuation operating circuit 312; a reactive positive phase voltage fluctuation operating circuit 313; a negative phase voltage fluctuation operating circuit 314; a harmonic wave voltage fluctuation operating circuit 315; an effective positive phase system voltage operating circuit 316; a reactive positive phase system voltage operating circuit 317; a negative phase system voltage operating circuit 318; and a harmonic wave system voltage operating circuit 319.

Receiving the system voltage Vf from voltage value reading unit 22, PLL circuit 301 detects the phase of system voltage Vf. Then, PLL circuit 301 outputs the detected phase information to system voltage simulating circuit 302 and flicker current factor decomposing circuit 311.

Based on the phase information from PLL circuit 301, system voltage simulating circuit 302 generates an ideal sinusoidal wave free of distortion and in-phase with system voltage Vf. In other words, system voltage simulating circuit 302 transforms the system voltage Vf to an ideal system voltage. The transformed system voltage Vf is input to effective positive phase system voltage operating circuit 316, reactive positive phase system voltage operating circuit 317, negative phase system voltage operating circuit 318 and harmonic wave system voltage operating circuit 319.

Receiving system voltage Vf from voltage value reading unit 20 and receiving load current If from current value reading unit 24, reactive power operating unit 304 operates reactive power Qβ generated on bus PL, from the system voltage Vf and load current If, in accordance with the method described above.

From the operated reactive power Qβ and the state of system voltage Vf, system impedance operating circuit 305 operates system impedance Zs, and outputs the operated system impedance Zs to effective positive phase voltage fluctuation operating circuit 312, reactive positive phase voltage fluctuation operating circuit 313, negative phase voltage fluctuation operating circuit 314 and harmonic wave voltage fluctuation operating circuit 315.

Flicker current factor decomposing circuit 311 analyzes four flicker factors generated by load 102 as the flicker source based on the phase information from PLL circuit 301 and actually measured data of load current If from current value reading unit 24, and outputs the result of analysis. A specific method of decomposing to these factors is described, for example, in Hirofumi AKAGI et al., "Generalized Theory of the Instantaneous Reactive Power and its Application", Journal B of Institute of Electrical Engineers of Japan, 1983, pp. 483-490.

Of the decomposed four factors, the effective positive phase component is output to effective positive phase voltage fluctuation operating circuit 312. The reactive positive phase component, negative phase component and harmonic wave component are respectively output to reactive positive phase voltage fluctuation operating circuit 313, negative phase voltage fluctuation operating circuit 314 and harmonic wave voltage fluctuation operating circuit 315.

Receiving the effective positive phase component from flicker current factor decomposing circuit 311 and receiving system impedance Zs from system impedance operating circuit 305, effective positive phase voltage fluctuation operating circuit 312 multiplies the effective positive phase component by the system impedance Zs, thereby to operate the voltage fluctuation generated by the effective positive phase component. Effective positive phase system voltage operating circuit 316 adds the operated voltage fluctuation of effective positive phase component to the ideal waveform of system voltage applied from system voltage simulating circuit 302, thereby to obtain a simulated waveform of effective positive phase system voltage. The obtained simulated waveform of effective positive phase system voltage is amplified to a level corresponding to AC 100V by an amplifier 401, and then output to effective positive phase flicker value measuring circuit 501.

Receiving the reactive positive phase component from flicker current factor decomposing circuit 311 and receiving system impedance Zs from system impedance operating circuit 305, reactive positive phase voltage fluctuation operating circuit 313 multiplies the reactive positive phase component by the system impedance Zs, thereby to operate voltage fluctuation generated by the reactive positive phase component. Reactive positive phase system voltage operating circuit 317 adds the operated voltage fluctuation corresponding to the reactive positive phase component to the ideal waveform of system voltage applied from system voltage simulating circuit 302, thereby to obtain the simulated waveform of reactive positive phase system voltage. The obtained simulated waveform of reactive positive phase system voltage is amplified to a level corresponding to AC 100V by an amplifier 402, and output to reactive positive phase flicker value measuring circuit 502.

Receiving the negative phase component from flicker current factor decomposing circuit 311 and receiving system impedance Zs from system impedance operating circuit 305, negative phase voltage fluctuation operating circuit 314 multiplies the negative phase component by the system impedance Zs, thereby to operate voltage fluctuation generated by the negative phase component. Negative phase system voltage operating circuit 318 adds the operated voltage fluctuation of negative phase component to the ideal waveform of system voltage applied from system voltage simulating circuit 302, thereby to obtain a simulated waveform of negative phase component. The obtained simulated waveform of negative phase system voltage is amplified to a level corresponding to AC 100V by an amplifier 403 and output to negative phase flicker value measuring circuit 503.

Receiving the harmonic wave component from flicker current factor decomposing circuit 311 and receiving system impedance Zs from system impedance operating circuit 305, harmonic wave voltage fluctuation operating circuit 315 multiplies the harmonic wave component by the system impedance Zs, thereby to operate voltage fluctuation generated by the harmonic wave component. Harmonic wave system voltage operating circuit 319 adds the operated voltage fluctuation of harmonic wave component to the ideal waveform of system voltage applied from system voltage simulating circuit 302, thereby to obtain a simulated waveform of system voltage corresponding to the harmonic wave component. The obtained simulated waveform of harmonic wave system voltage is amplified to a level corresponding to AC 100V by an amplifier 404, and output to harmonic wave flicker value measuring circuit 504.

In flicker meter 50B, each of four flicker value measuring circuits 501 to 504 provided corresponding to the four factors measures the flicker value ΔV10 of the input simulated system voltage waveform.

Finally, flicker factor ratio operating unit 70 operates ratio of four factor components, based on four flicker values output from flicker value measuring circuits 501 to 504, respectively.

As described above, according to the present embodiment, it becomes possible to analyze factors inherent to the flicker source. The flicker factor analysis is useful when specification and characteristics of static reactive power compensator 104 are determined to mitigate voltage flicker in more effective or more economically preferable manner. By way of example, if it is found as a result of factor analysis that the factor of reactive power component is dominant and the factor of negative phase component is less dominant, it is possible to apply Static Var Compensator (SVC), which is economically preferable, as the static reactive power compensator.

Further, as the operated value of system impedance Zs is used for operating system voltage necessary for flicker factor analysis, factor analysis of higher accuracy becomes possible.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A flicker improvement effect evaluating system for evaluating an effect of improving voltage flicker attained by a compensator introduced to a power system having a load connected to a prescribed bus, comprising:
    a system voltage detecting unit detecting a system voltage;
    a load current detecting unit detecting a load current flowing to said load through said prescribed bus;
    a compensation current operating unit operating a compensation current output by said compensator, based on detected said system voltage and said load current,
    a system impedance operating unit operating system impedance of said power system based on detected said system voltage and said load current;
    a not-yet-improved system voltage operating unit simulating a not-yet-improved system voltage at present, from said operated system impedance and detected said system voltage and said load current;
    an improved system voltage operating unit simulating an improved system voltage from operated said compensation current and said system impedance and from detected said system voltage,
    a voltage flicker detecting unit detecting voltage flicker of each of said operated not-yet-improved system voltage and said improved system voltage; and
    an improvement rate operating unit operating rate of improvement attained by said compensator, from said detected respective voltage flickers.

2. The flicker improvement effect evaluating system according to claim 1, wherein
    a flicker factor decomposing unit analyzing factors of voltage flicker generated by said load, based on detected said system voltage and said load current;
    a system voltage operating unit simulating system voltage corresponding to each factor of said voltage flicker, from the analyzed factors of said voltage flicker, said operated system impedance and said detected system voltage, and
    a flicker factor ratio operating unit operating ratio of factors of said voltage flicker by detecting voltage flicker of system voltage corresponding to each factor of said operated voltage flicker.

3. The flicker improvement effect evaluating system according to claim 1, further comprising:
    a detected value storage unit storing said system voltage detected by said system voltage detecting unit and said load current detected by said load current detecting unit; and
    a detected value reading unit allowing arbitrary reading of said system voltage and said load current stored in said detected value storage unit.

4. A flicker improvement effect evaluating system for evaluating an effect of improving voltage flicker attained by a compensator introduced to a power system having a load connected to a prescribed bus, comprising:
    a system voltage detecting unit detecting a system voltage;
    a load current detecting unit detecting a load current flowing to said load through said prescribed bus;
    a compensation current operating unit operating a compensation current output by said compensator, based on detected said system voltage and said load current;
    a system impedance setting unit setting system impedance of said power system to an arbitrary impedance value;
    a not-yet-improved system voltage operating unit simulating a not-yet-improved system voltage at present from said set system impedance and detected said system voltage and said load current;
    an improved system voltage operating unit simulating an improved system voltage from operated said compensation current, set said system impedance and detected said system voltage;
    a voltage flicker detecting unit detecting voltage flicker of each of operated said not-yet-improved system voltage and said improved system voltage; and
    an improvement rate operating unit operating rate of improvement attained by said compensator, from said detected respective voltage flickers.

5. The flicker improvement effect evaluating system according to claim 4, further comprising:
    a detected value storage unit storing said system voltage detected by said system voltage detecting unit and said load current detected by said load current detecting unit, and
    a detected value reading unit allowing arbitrary reading of said system voltage and said load current stored in said detected value storage unit.

* * * * *